(12) United States Patent
Nighy

(10) Patent No.: US 7,472,805 B2
(45) Date of Patent: Jan. 6, 2009

(54) BEVERAGE DISPENSER

(75) Inventor: Richard John Nighy, Stratford on Avon (GB)

(73) Assignee: IMI Vision Limited, Alcester, Warwickshire (GB)

( * ) Notice: Subject to any disclaimer, the term of this patent is extended or adjusted under 35 U.S.C. 154(b) by 0 days.

(21) Appl. No.: 11/706,735

(22) Filed: Feb. 15, 2007

(65) Prior Publication Data

US 2007/0164046 A1 Jul. 19, 2007

Related U.S. Application Data

(63) Continuation-in-part of application No. 10/926,491, filed on Aug. 26, 2004.

(51) Int. Cl.
*B67D 5/56* (2006.01)

(52) U.S. Cl. ............... 222/129.1; 222/135; 222/145.5; 222/145.6; 222/255; 222/325

(58) Field of Classification Search ............... 222/148, 222/145.5, 145.6, 255, 129.1, 133, 129.2, 222/134, 129.3, 135, 129.4, 52, 56, 59, 64, 222/504, 256, 258, 386, 384, 325–326, 207
See application file for complete search history.

(56) References Cited

U.S. PATENT DOCUMENTS

| | | | | | |
|---|---|---|---|---|---|
| 3,159,190 | A | * | 12/1964 | Skiera et al. | 141/369 |
| 3,591,051 | A | * | 7/1971 | Mitchell et al. | 222/56 |
| 4,886,190 | A | * | 12/1989 | Kirschner et al. | 222/57 |
| 5,381,926 | A | * | 1/1995 | Credle et al. | 222/1 |
| 5,842,603 | A | * | 12/1998 | Schroeder et al. | 222/23 |
| 5,931,343 | A | * | 8/1999 | Topar et al. | 222/56 |
| 5,975,357 | A | * | 11/1999 | Topar | 222/56 |
| 6,435,375 | B2 | * | 8/2002 | Durham et al. | 222/129.1 |
| 6,450,369 | B1 | * | 9/2002 | Heyes | 222/129.1 |

* cited by examiner

*Primary Examiner*—Frederick C. Nicolas
(74) *Attorney, Agent, or Firm*—Pyle & Piontek, LLC

(57) ABSTRACT

A disposable pump cartridge for use in conjunction with a pump driver characterized in the disposable pump unit containing a pair of piston pumps and inlet and outlet valves positioned at one end of each piston. The piston pump has a pair of pistons arranged for reciprocal motion and which are retained by a retainer adjacent the inlet and outlet valves during transit.

17 Claims, 8 Drawing Sheets

BEVERAGE DISPENSER

This application is a continuation-in-part of co-pending application Ser. No. 10/926,491, filed Aug. 26, 2004.

FIELD OF THE INVENTION

This invention relates to dispensers in general and more specifically to dispensers for use in beverage and medical applications and pump cartridges therefore.

BACKGROUND OF THE INVENTION

Beverage dispensers for juice, particularly for orange juice, are required to pump a high viscosity juice concentrate and accurately control the ratio of juice concentrate to diluent to produce a beverage of uniform standard. Such dispensers commonly comprise a diluent inlet line from a pressurised diluent source, a juice concentrate reservoir and means for delivering concentrate from the reservoir to the dispenser, which delivering means customarily comprises one of means for pressurising the concentrate reservoir and controlling the flow of concentrate through a valve, means for pumping concentrate from the reservoir and controlling the flow through a valve, or means for volumetrically pumping concentrate from the reservoir. It is known that there are advantages to having a juice concentrate delivery system in which those parts of the system that contact the concentrate are disposable in order to maintain sanitation and reducing the risk of contamination through substandard cleaning of the system.

To improve sanitation in the delivery of juice concentrate from a concentrate reservoir to a juice dispenser the art contemplates use of a rotary peristaltic pump to deliver the concentrate, a deformable tube of which pump forms an integral part of a disposable concentrate reservoir, and use of a positive displacement pump that includes a disposable piston-type pump portion supplied with the concentrate reservoir and a non-disposable drive for reciprocating the pump to draw fluid into and expel it from the disposable pump, as shown in U.S. Pat. Nos. 5,114,047 and 5,154,319.

Peristaltic pumps provide a reasonable solution for sanitation problems, but often experience problems pumping higher viscosity fluids such as juice concentrate, and as the viscosity of juice concentrate can be highly dependant on its temperature, peristaltic systems often do not dispense a correct ratio of juice concentrate to diluent at lower temperatures. In addition, the tube part of the pump often deforms to a permanent set over time, such that the volumetric output towards the end of its life is less than that at the beginning of its life, again affecting the ratio of the mix of concentrate to diluent Positive displacement pumps, such as that in U.S. Pat. No. 5,114,047, produce a more constant ratio of the mix of juice concentrate to diluent, but because they have a fill cycle and a dispense cycle, the beverage will have a stratified appearance as it exits the dispenser as a result of the concentrate being intermittently dispensed into the diluent stream.

In medical applications dispensers are often required to dispense medical fluids, for example medications, either at their stored concentration or at a lower concentration. These medical applications exist both at patient care level, i.e. administration of medications directly to patients, for example intravenously, and in other areas, for example in dispensaries. With patients contracting such infections as MRSA whilst in hospital it is important that a high level of cleanliness is maintained in medical equipment and drug administration. Many current medical pumps use a disposable reservoir of fluid and a non disposable pump, the pump being required to be cleaned thoroughly between uses, or before every use in infrequently used equipment This cleaning of the pumps needs a human operation to ensure they are adequately cleaned and such human operation introduces the risk of errors and incomplete cleaning.

OBJECT OF THE INVENTION

A primary object of the invention is to provide a disposable piston pump cartridge suitable for use in a beverage dispenser to pump a beverage concentrate or in a medical application capable of pumping a medical fluid.

SUMMARY OF THE INVENTION

In accordance with the present invention, apparatus for dispensing a post-mix beverage comprises a reservoir of beverage concentrate; a disposable pump unit including a pair of piston pumps having inlet means fluid coupled to beverage concentrate in the reservoir and outlet means; and pump drive means for being coupled to the disposable pump unit for operating the pump unit to pump concentrate from the inlet means to the outlet means. Valves within the disposable pump unit are arranged to enable the pump to prime itself and purge substantially all of the air from pump. Also included is a mixer fluid coupled to the pump unit outlet means; a control valve having an inlet for being fluid coupled to a supply of diluent for the beverage concentrate and an outlet for being fluid coupled to introduce diluent to beverage concentrate intermediate the disposable pump outlet means and the mixer; and control system means. The control system means operates the pump drive means and the control valve to provide a predetermined ratio of diluent to concentrate as delivered to the mixer.

The invention also contemplates a disposable pump unit for use in a pump suitable for pumping a beverage concentrate, for example in the apparatus described above. The disposable pump unit is also suitable for use in other pumps, particularly in medical applications.

The invention further contemplates a method of dispensing a post-mix beverage, which method comprises the steps of providing a reservoir of beverage concentrate; fluid coupling an inlet to a pair of piston pumps of a disposable pump unit to beverage concentrate in the reservoir; and fluid coupling an outlet from the pair of piston pumps to a mixer. Also induded are the steps of connecting a pump drive to the disposable pump unit to operate the piston pumps; controlling the pump drive to reciprocate pistons of the pair of piston pumps of the disposable pump unit to pump beverage concentrate from the inlet to the pair of piston pumps to the outlet from the pair of piston pumps; delivering beverage concentrate from the outlet from the piston pumps to a mixer; and fluid coupling diluent for the beverage concentrate from a supply of diluent through a control valve to the beverage concentrate being delivered to the mixer to introduce diluent to the concentrate. Further included is the step of controlling operation of the pump drive and the control valve so that a predetermined ratio of diluent to beverage concentrate is delivered to the mixer.

The foregoing and other objects, advantages and features of the invention will become apparent from a consideration of the following detailed description when taken in conjunction with the accompanying drawings.

BRIEF DESCRIPTION OF THE DRAWINGS

Embodiments of the invention will now be described, by way of example only, with reference to the accompanying drawings in which.

DETAILED DESCRIPTION

Figure 1:
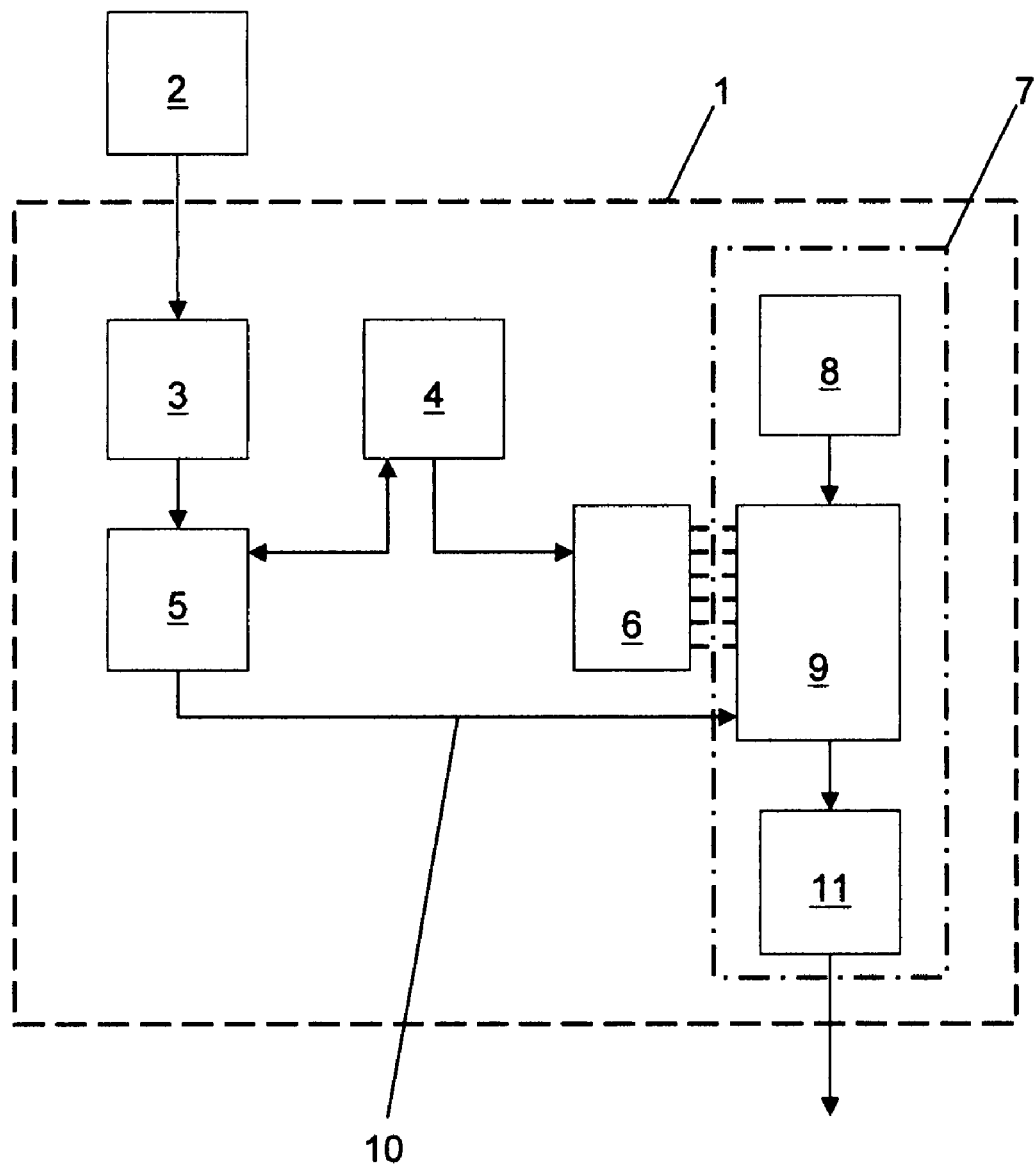
FIG. 1 is a schematic diagram of a dispenser in accordance with the invention.

Referring to FIG. 1, a schematic diagram of a beverage dispenser 1 connected to a diluent supply 2, which may be a supply of mains water. When the diluent enters the dispenser it is cooled in a cooling unit 3 to the required temperature for a beverage, commonly in the region of about 35° F. to 43° F. The cooling unit 3 may be a water bath heat exchanger or other type of cooling technology known in the art, such as a cold plate. An electronic controller 4 receives signals from a diluent flow measurement device (not shown) that may be part of a control valve 5 through which passes cooled diluent from the cooling unit 3. Electronic controller 4 operates both the control valve 5 and a pump drive 6 in a manner to bring together cooled diluent and juice concentrate in a predetermined ratio for being mixed together and dispensed as a beverage. Situated within or attached to dispenser 1 is a disposable concentrate unit 7. The concentrate unit 7 comprises a concentrate reservoir 8, a twin barrel piston pump cartridge 9 driven by the pump drive 6 and connected to and for receiving juice concentrate from the concentrate reservoir 8, a diluent conduit 10 fluid coupled to an outlet from the control valve 5 for delivering cooled diluent to the concentrate unit 7 for introduction to juice concentrate delivered from the piston pump cartridge 9, and a static mixer 11 for mixing the juice concentrate and diluent to form a homogeneous mixture.

Figure 2:
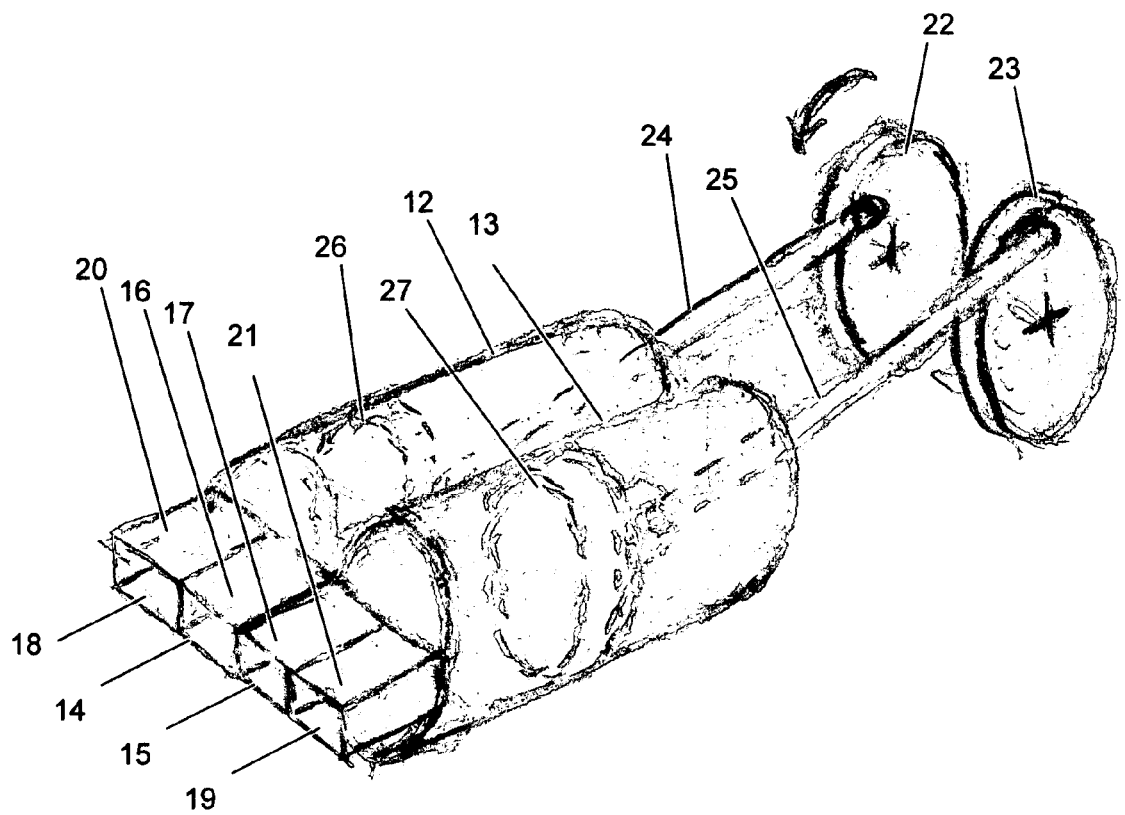
FIG. 2 is a perspective view of a twin barrel syringe pump for use in the invention.

FIG. 2 shows an output from the non-disposable pump drive 6 mechanically coupled to the twin barrel piston pump cartridge 9 (FIG. 1). A contemplated embodiment of the twin barrel piston pump 9 comprises two syringe type pump cylinders or barrels 12 and 13 that have associated inlets 14 and 15 fluid coupled to juice concentrate in the concentrate reservoir 8 (FIG. 1). The pump inlets 14 and 15 are provided with respective inlet check valves 16 and 17 that allow flow of concentrate from the concentrate reservoir 8 through the inlets into the pump barrels 12 and 13, but prevent backflow of concentrate out of the barrels through the inlets. The barrels 12 and 13 also have associated outlets 18 and 19 fluid coupled to the static mixer 11. The outlets 18 and 19 are provided with respective outlet check valves 20 and 21 that allow flow of concentrate from the barrels through the outlets to the static mixer 11 (FIG. 1), but prevent a reverse flow of concentrate back through the outlets.

In operation of the concentrate pumping mechanism, a pair of rotary cams 22 and 23 is coupled to an output from the pump drive 6 for being rotated by the pump drive. The cams 22 and 23 are also coupled via interface means comprising associated piston or cam rods 24 and 25 to respective ones of a pair of plungers or pistons 26 and 27 disposed for reciprocation in respective cylinders 12 and 13. Operation of the pump drive 6 therefore rotates the cams 22 and 23 to reciprocate the pistons 26 and 27 in both directions in the piston pump barrels 12 and 13 to thereby alternatively draw concentrate into the barrels through the check valves 16 and 17 and to eject fluid out of the barrels through the check valves 20 and 21. The arrangement advantageously is such that the directions of reciprocation of the pistons 26 and 27 through the cylinders 12 and 13 are 180° out of phase, so that while the plunger 26 is being drawn back through the barrel 12 to draw fluid into the barrel through the inlet 14 and the check valve 16, the plunger 27 is being driven forward through the barrel 13 to expel fluid from the barrel through outlet 19 and check valve 21. The cams 22 and 23 may be rotated together at a constant speed but, preferably, the rate of rotation of each cam is independently controlled and the speed of rotation is modulated, so that the plungers 26 and 27 are withdrawn through the barrels 12 and 13 at a faster rate than they are driven forward through the barrels, thereby to enable whichever barrel 12 or 13 is not then dispensing fluid to be fully filled with fluid and ready to dispense before the barrel that is then dispensing fluid is at the end of its dispensing stroke. Alternatively this effect may be achieved by rotating the cams at a constant speed and altering the profile of the cam such that the plungers are driven forward at a slower speed than they are withdrawn allowing for an overlap of dispense from each barrel. The result either way is that the twin barrel piston pump 9 delivers to the mixer 11 a substantially constant and uninterrupted output flow of concentrate during a beverage dispense cycle. Other methods of controlling the overlap of the pistons, for example the use profiled cam surfaces, wherein the profile of the cams provides an overlap, driven off a single drive are anticipated and are within the intended scope of the invention.

Figure 3:
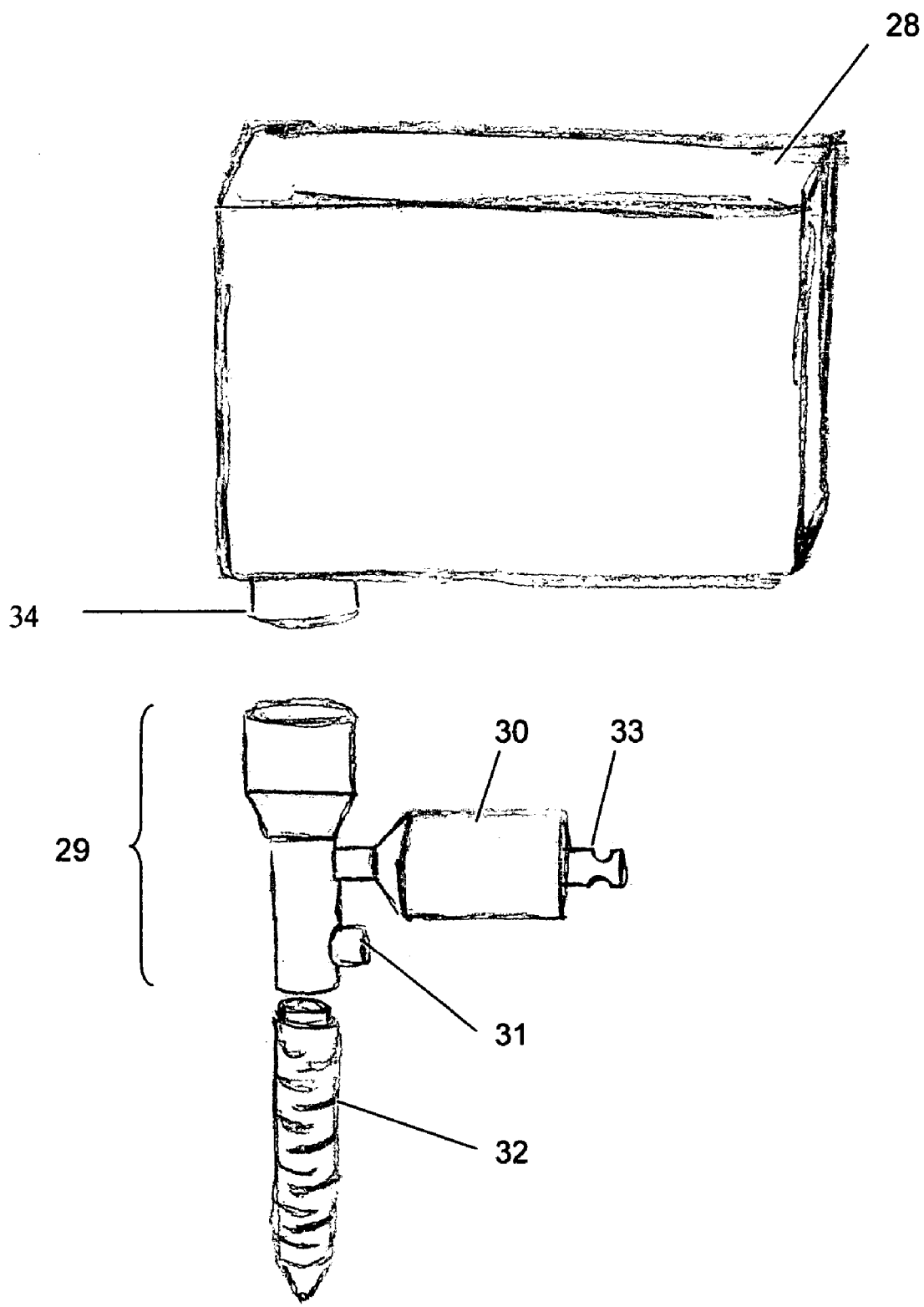
FIG. 3 is an exploded diagram of a concentrate reservoir, pump and mixing element for use in a dispenser of the invention.

FIG. 3 shows a disposable liquid juice concentrate reservoir 28 that is connectable to a disposable twin barrel piston pump element or cartridge 29. The pump element 29 includes a twin barrel piston pump 30 of a type heretofore described, for pumping the juice concentrate received from the reservoir 28. A water inlet 31 through which a moderated flow of water is passed from the control valve 5 provides for introduction of diluent to concentrate discharged from the pump 30. The control valve 5 and the pump drive 6 are operated by the control electronics 4 in such manner as to provide, upstream of a mixer 32, the bringing together of a predetermined constant ratio of diluent to juice concentrate, depending upon the particular beverage to be served by the dispenser 1. The concentrate and water diluent are then flowed together through a static mixer 32 to provide a substantially homogeneous mixture of diluted concentrate which is dispensed into a receptacle in a conventional known manner. In the arrangement shown in this FIG. 3 the disposable twin barrel piston pump 30 has plunger extensions 33 removably connectable to a pump driver, such as the pump drive 6. The reservoir 28 has an outlet 34 to which one or more inlets to the disposable pump element 29 are connected for receiving concentrate.

The reservoir outlet 34 is provided with a protective cap or film (not shown) to cover and seal it during storage and transport It is appreciated that because the drive system reciprocates the pistons 26 and 27 alternately through their pumping strokes in the barrels 26 and 27 of the disposable twin barrel piston pump cartridge 9, the pump provides a substantially constant and uninterrupted output flow of juice concentrate during a beverage dispense cycle. Also, because the juice concentrate flows primarily through the disposable concentrate unit 7, which includes the disposable concentrate reservoir 8, twin piston pump cartridge 9 and static mixer 11, the juice concentrate comes into contact primarily with disposable parts, so that there are a minimum of non-disposable dispenser parts to be cleaned of juice concentrate, which provides for improved sanitation. When the reservoir of juice concentrate 8 is exhausted, the concentrate unit 7 is simply removed and replaced with a fresh concentrate unit having a full concentrate reservoir 8, so there is no need to be concerned with cleaning the previously used concentrate reservoir 8, twin barrel piston pump cartridge 9 and mixer 11.

Advantageously, because the pump drive 6 is controllable to operate independently on the two pistons 26 and 27 of the disposable pump element 9 to enable the pump fill cycle to be performed in a shorter time that the pump discharge cycle, provision can be made for a desired amount of overlap in the pumping actions of the two pump barrels, so that there is substantially no perceptible change in concentrate output from the pump as the output flow changes from one barrel to the other. The rotary motion of the cams 22 and 23 as driven by the pump drive 6 is translated into linear motion of the pistons 26 and 27, such that control of the motion of the pistons can be dictated by control of the relative individual speeds at which the cams are rotated. Alternatively, an arrangement is contemplated where outer ends of the piston rods 24 and 25 would ride on outer peripheral cam surfaces of the cams 22 and 23 (or alternatively in cam tracks on the surface of the cams), in which case the cams could be rotated at the same speed with the speed of fill and dispense of the barrels 12 and 13 of the pump element 9 then being controlled by the profile of the cam surfaces.

It is understood that the dispenser 1 has a user interface and can be programmed to operate the control valve 5 and the pump drive 6 to either dispense beverages of selected sizes or to accommodate a continuous pour mode in which the dispenser continuously dispenses a beverage until signalled to stop. Preferably the dispenser further includes a sensor to measure the flow of diluent being mixed with the concentrate the pump can therefore be moderated to match the water flow rate and give a constant ratiometric output Alternatively the water flow rate may be controlled to match a desired pump speed and output rate.

Preferably, an input signal is provided to the control electronics 4 when a new concentrate unit 7 is installed with a full concentrate reservoir 8, either by means of a user manually inputting a signal, for instance by pressing a reset button, or automatically by identification means on the concentrate unit, for instance an RFID tag on the concentrate reservoir and an associated reader in the dispenser 1. The input signal would be used to initiate a drinks countdown, such that when there is only a specific amount of concentrate remaining, as determined by the size and number of drinks served, an indication is given to the operator that the concentrate will soon need replacing, with a second signal being sent to the operator when the concentrate reservoir is empty. These signals may take the form of warning lights of different colours or they could comprise a countdown of remaining drinks to be dispensed. In addition, control of the concentrate flow rate can initially be set in accordance with the parameters of the particular concentrate used. Such parameters may be stored in a memory of the control electronics 4 of the dispenser 1 or, alternatively, may be automatically input to the dispenser for each concentrate reservoir as it is installed, for example by means of data stored in a RFID tag or input by an operator manually or via a handheld device.

Further, while the invention has been described as having the concentrate reservoir 8 and disposable twin barrel piston pump cartridge be part of a single unitary component, i.e., the concentrate unit 7, it is contemplated that the concentrate reservoir and disposable pump cartridge be supplied as two separate parts which are connected together either immediately prior to or during installation into the dispenser. Preferably, once the disposable pump cartridge 9 and juice concentrate reservoir 8 have been connected they cannot be disconnected, thus preventing reuse of the pump cartridge. However, should the pump cartridge and reservoir be capable of disconnection for reuse of the pump cartridge, then a limitation is placed on the number of times the pump cartridge can be reused.

Figure 4:
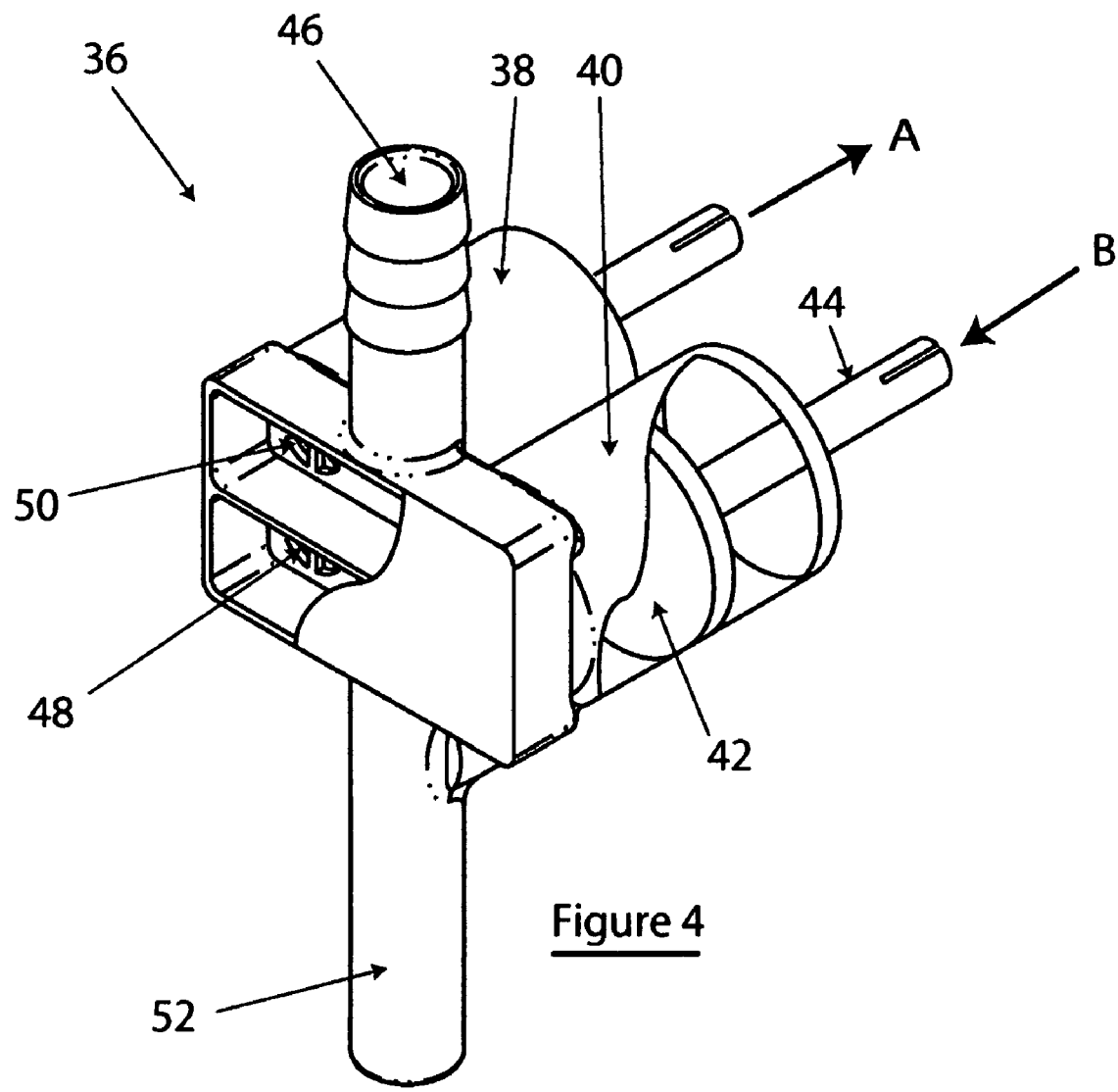
FIG. 4 is a perspective view of a disposable pump unit of the invention.

Referring to FIG. 4, a partially cut away view of a disposable pump cartridge 36 of the invention is shown. The pump cartridge comprises two barrels 38, 40 in each of which a piston 42 is arranged for reciprocating movement. The piston 42 is connected to a piston shaft 44 for attachment to a driver (not shown). As the piston is moved in the barrel in direction "A" fluid is drawn into the barrel from fluid inlet 46 via inlet valve 50 which is a simple flap valve, and as the piston 44 is moved in direction "B" the fluid in the barrel is ejected through outlet valve 48 and exits the pump at pump outlet 52.

Figure 5:
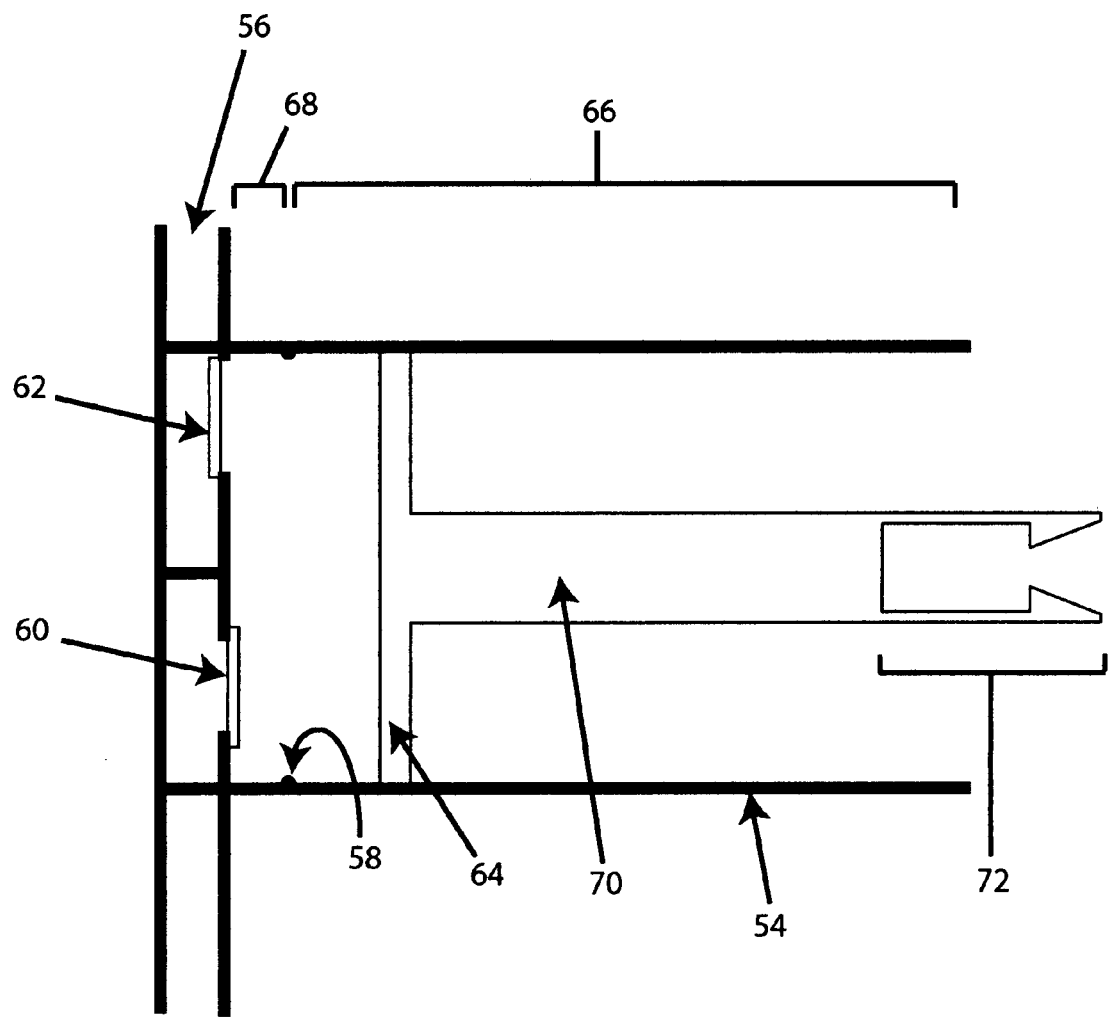
FIG. 5 is a cross section through a disposable pump cartridge of the invention.

Referring to FIG. 5, a cross section through one of the barrels of FIG. 4 is shown. In use the fluid inlet 56 is connected to a reservoir of fluid (not shown). The barrel has a protrusion 58 in its inner diameter towards the end housing the inlet valve 60 and outlet valve 62. The piston 64 is movable within the barrel 54, past the protrusion 58, between an operative zone 66 and a retained position 68 in which it is retained by the protrusion 58. When in its retained position 68 a sufficiently high force is required to move the piston 64 from its retained position 68 to its operative zone 66 that it will not easily move out of its retained position 68 as a result of hydrostatic pressures created by the fluid in the reservoir during transit, for example if it were dropped. The piston has piston shaft 70 which has an engagement means 72 by which it can be coupled to a pump driver. The piston 64 and piston shaft 70 are made out of polyethylene or another suitable plastics material.

Figure 6:
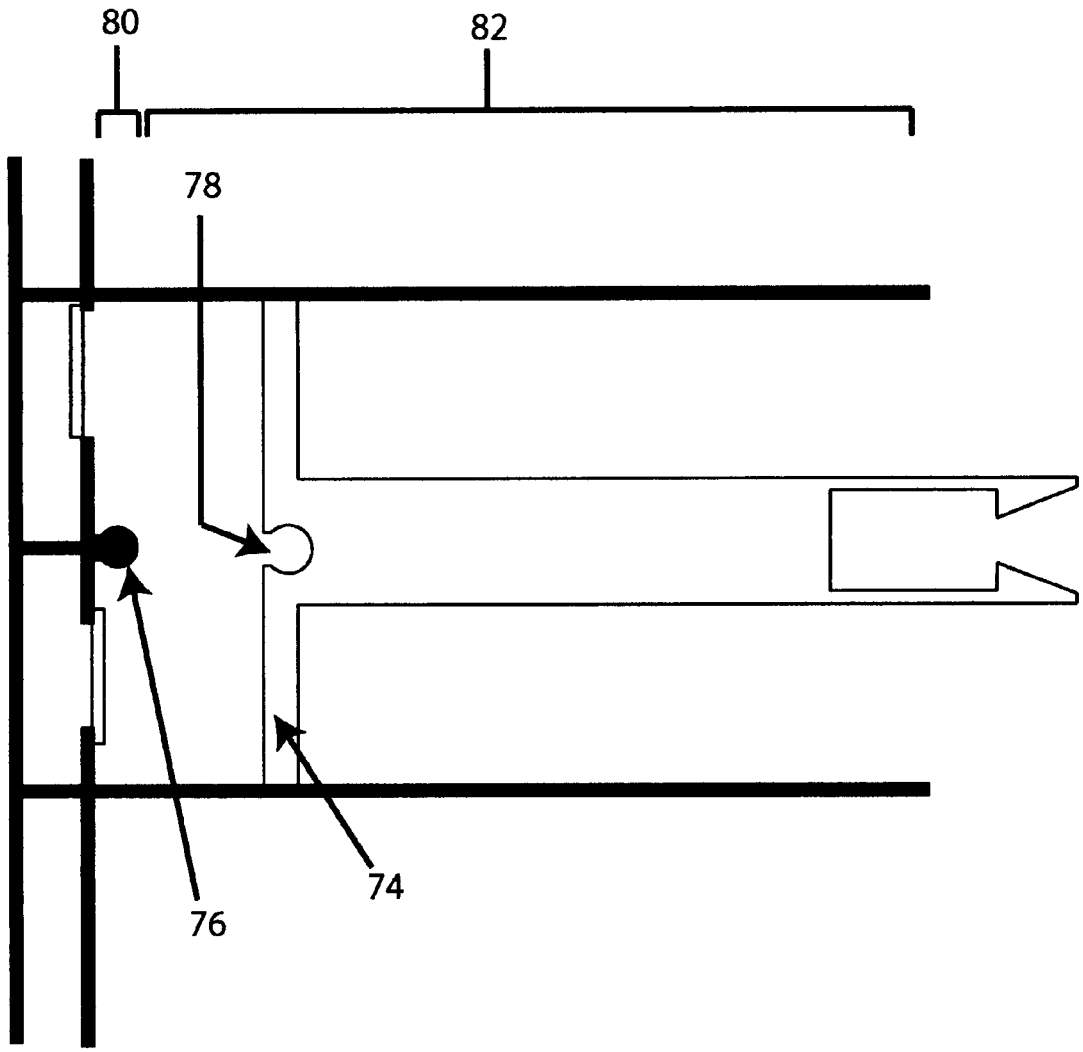
FIG. 6 is a cross section through an alternative pump cartridge of the invention.

Referring to FIG. 6, an alternative arrangement of a pump suitable for use in the invention is shown. In this arrangement the piston 74 has a recess 78 centrally located on its face, the recess has a narrow mouth and then opens out into a small cavity. The body of the pump has a protrusion 76 which, at its widest point, is wider that the mouth of the recess 78 on the piston 74. In use, the piston can be pushed onto the protrusion 76 such that the mouth of the recess deforms allowing the protrusion 76 to enter into the cavity 78. The piston 74 then substantially elastically recovers its shape around the protrusion 76 retaining the piston 74 in its retained position 80. The operation of the pump and the engagement and disengagement with the drive system is as described with reference to FIGS. 3a-e and 4a-e. This design is slightly advantageous in that the retained position 80 is reduced and the operative zone 82 is enlarged. The implications of this is that for the same sized pump more fluid can be pumped per stroke and the amount of fluid left in the dead space in the retained position during normal operation is minimised.

Figure 7:
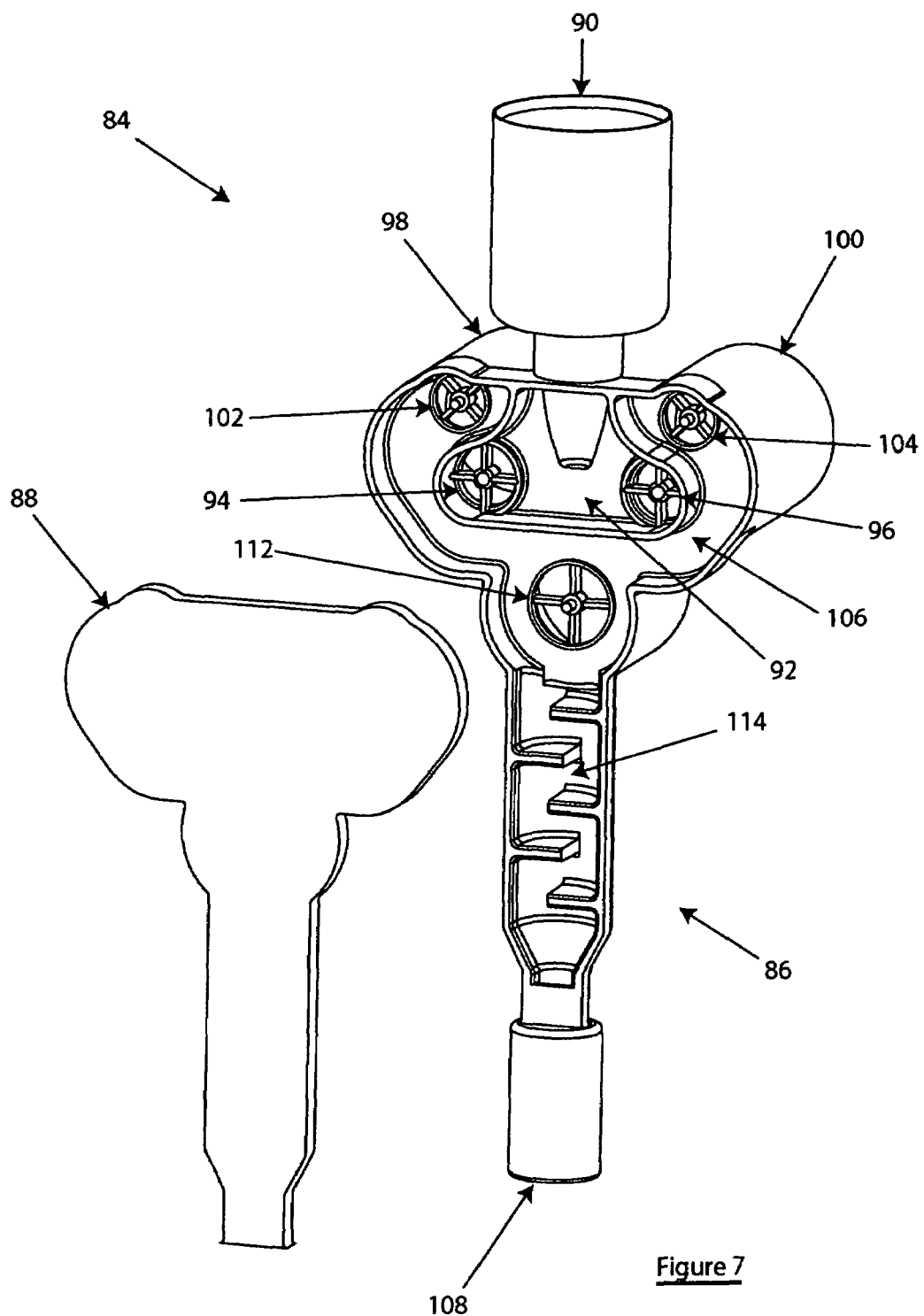
FIG. 7 is a perspective view of a pump cartridge of the invention.
Figure 8:
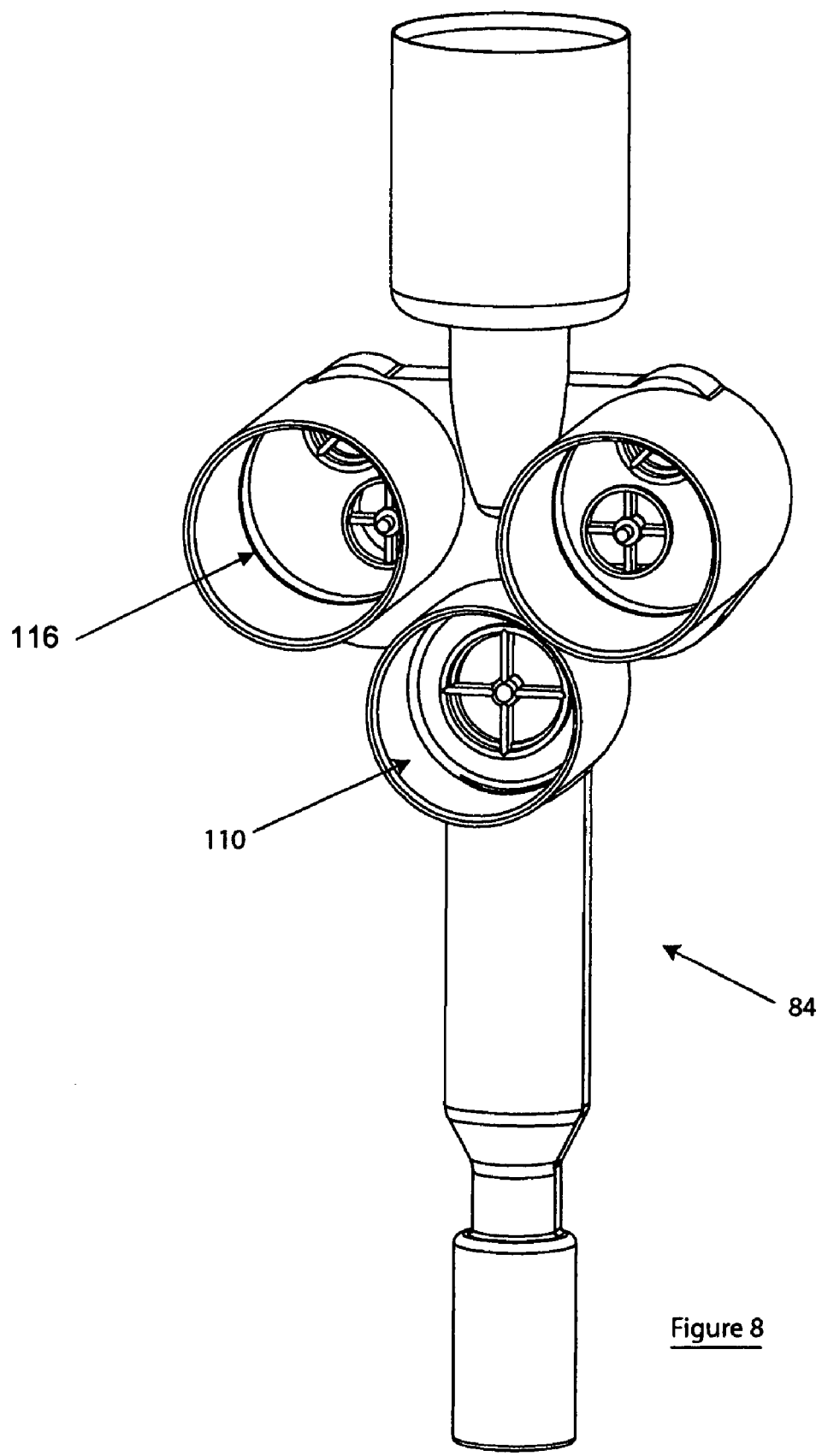
FIG. 8 is a perspective view of the rear of the pump cartridge shown in FIG. 7.

Referring to FIGS. 7 and 8, a detailed view of a disposable pump unit 84 is shown. The unit 84 is manufactured of two parts a body section 86 and a cover section 88. The body section 86 is a simple plastics moulding and is preferably made of low density polyethylene. The cover 88 is ultrasonically welded to the body section 86 so as to enclose an open face thereof. The body section comprises an inlet 90 connected in use to a reservoir containing the substance to be pumped. The inlet 90 opens into an inlet valving chamber 92 from which two inlet valves 94, 96 lead into the end faces of the barrels 98, 100 of the pump unit 84. The pump barrels 98, 100 each have a piston therein (omitted or clarity). At the highest most position on the end face of each barrel 98, 100 is situated an outlet valve 102, 104 leading from the barrels 98, 100 into an outlet valve chamber 106. By placing the outlet valves 102, 104 at the very top of the barrels and having them situated above the inlet valves 94, 96, the system is essentially self bleeding as any air within the barrels 98, 100 will rise to the top of the barrel and be expelled therefrom via the outlet valves 102, 104 and dead space in which air can collect at the top of the barrels is avoided. As the volume of air trapped in any dead space will vary from use to use, ad even from stroke to stroke, good priming and eliminating dead space enables a highly repeatable pump to be effected. The inlet valves 94, 96 and the outlet valves 102,104 are umbrella or flap type check valves and allow flow in the direction from the inlet 90 to the outlet 108 but not in the reverse direction. The pump unit 84 has a diluent inlet 110 to which diluent can be supplied. Situated in the mouth of the diluent inlet 110 is a diluent check valve 112 to prevent flow of concentrate from the barrels 98, 100 into the diluent inlet In addition the check valve operates to prevent drips from the pump via the diluent inlet when the pump is disconnected from the machine. The fluid being pumped, e.g. a beverage concentrate or medication, and the diluent mix in the outlet valve chamber 106 and pass together through a static mixer 114 before exiting the pump unit 84 via the outlet 108. A protrusion 116 to retain the piston in its retained position during, for example transit (as described in relation to FIG. 4) is shown.

While embodiments of the invention have been described in detail, various modifications and other embodiments thereof may be devised by one skilled in the art without departing from the spirit and scope of the invention, as defined in the appended claims.

What is claimed is:

1. A disposable pump comprising:
    a pump section having two pump barrels each having a piston therein, said pistons having means for releasably connecting said pistons to a non-disposable pump drive for driving said pistons of said disposable pump cartridge; and
    a valving chamber having a fluid inlet for connection to a source of fluid to be pumped, a fluid outlet through which pumped fluid is expelled from said pump cartridge, a pump inlet chamber intermediate and connecting said fluid inlet to said pump barrels via inlet valves thereof, and a pump outlet chamber intermediate and connecting said pump barrels to said fluid outlet via outlet valves thereof,
    wherein said pump section and said valving chamber comprise a single unitary cartridge.

2. A disposable pump cartridge according to claim 1, wherein said valving chamber further comprises a diluent inlet to said pump outlet chamber downstream of said outlet valves and upstream of said pump outlet such that, in use, a diluent is introduced into the fluid being pumped prior to the fluid issuing from said pump outlet.

3. A disposable pump cartridge according to claim 2, wherein said valving chamber further comprises a mixing means in said pump outlet chamber between said diluent inlet and said pump outlet through which the fluid being pumped and the diluent pass and mix therein, such that a substantially homogeneous mixture issues from said pump outlet.

4. A disposable pump cartridge according to claim 1, wherein each of said pump barrels includes retention means arranged to retain each said piston in a position adjacent each said piston's associated inlet and outlet valves during transit.

5. A disposable pump cartridge according to claim 1 wherein said outlet valves are positioned in end faces of said pump barrels.

6. A disposable pump cartridge according to claim 5 wherein each said outlet valve comprises a check valve.

7. A disposable pump cartridge according to claim 1 wherein said inlet and outlet valves are in end faces of said pump barrels and in use of said pump cartridge said inlet valves are positioned below said outlet valves.

8. A disposable pump cartridge according to claim 7 wherein each said inlet valve comprises a check valve.

9. A disposable pump cartridge for use with a non-disposable pump drive, the cartridge comprising:
    two pump barrels each having an associated piston therein, said pistons having means for connecting them to a drive means for driving the pistons of the disposable pump cartridge,
    a fluid inlet for connection to a source of fluid to be pumped, said fluid inlet leading to two inlet valves each leading into one of the two barrels,
    two outlet valves each leading from one of said two barrels to a pump outlet, and
    retention means arranged to retain the pistons in a position adjacent the inlet and outlet valves during transit,
    wherein the retention means comprises one or more protrusions on one of the barrel and piston of each associated barrel and piston which retain the piston in the position adjacent the inlet and outlet valves.

10. A disposable pump cartridge according to claim 9, wherein the protrusions are on inner surfaces of the barrels and the retention means further comprises grooves on the piston which interact with the protrusions.

11. A disposable pump cartridge according to claim 9, wherein the retention means further comprises a recess in a face of each piston and the protrusions are on end faces of the barrels containing the inlet and outlet valves and interface with the recesses in the faces of the pistons.

12. A disposable pump cartridge according to claim 9, wherein each said barrel is a plastics moulding and the protrusions are integral to that moulding.

13. A disposable pump cartridge according to claim 9, wherein the retention means further comprises a groove on the inner surface of each barrel which interact with one or more protrusions on the pistons to retain the pistons in the position adjacent the inlet and outlet valves.

14. A disposable pump cartridge according to claim 13, wherein the piston is a plastics molding and the protrusion is integral to the plastics molding.

15. A unitary disposable pump cartridge for use with a non-disposable pump drive, said cartridge comprising:
    two pump barrels each having a piston therein, said pistons having means for releasably connecting said pistons to the non-disposable pump drive for driving said pistons of said disposable pump cartridge, said releasably connecting means accommodating convenient attachment of said pistons to the non-disposable pump drive for use of said disposable pump cartridge in pumping fluid from a supply of the fluid, and convenient detachment of said pistons from the non-disposable pump drive for replacement of said disposable pump cartridge with another disposable pump cartridge upon replacement of the supply of the fluid, a fluid inlet for connection to a source of fluid to be pumped, said fluid inlet leading to two inlet valves each leading into one of said two barrels, and two outlet valves each leading from one of said two barrels to a pump outlet.

16. A unitary disposable pump cartridge for use with a non-disposable pump drive, said cartridge comprising:

two pump barrels each having a piston therein, said pistons having means for releasably connecting said pistons to the non-disposable pump drive for driving said pistons of said disposable pump cartridge, said releasably connecting means accommodating convenient attachment of said pistons to the non-disposable pump drive for use of said disposable pump cartridge in pumping fluid from a supply of the fluid, and convenient detachment of said pistons from the non-disposable pump drive for replacement of said disposable pump cartridge with another disposable pump cartridge upon replacement of the supply of the fluid, a fluid inlet for connection to a source of fluid to be pumped, said fluid inlet leading to two inlet valves each leading into one of said two barrels, and two outlet valves each leading from one of said two barrels to a pump outlet, wherein said pump cartridge substantially comprises plastics injection molding.

17. In combination, a fluid container and a disposable pump cartridge coupled to said fluid container for pumping fluid from said container, said disposable pump cartridge comprising a fluid inlet coupled to fluid in said container, a fluid outlet, two pump barrels each having a piston therein, two inlet valves fluid coupled to said fluid inlet and each leading to one of said two barrels, two outlet valves fluid coupled to said fluid outlet and each leading from one of said two barrels, said pistons having means for releasably connecting said pistons to a non- disposable pump drive for driving said pistons of said disposable pump cartridge, said releasably connecting means accommodating convenient attachment of said pistons to the non-disposable pump drive for operation of said disposable pump cartridge to pump fluid from said container, and convenient detachment of said pistons from the non-disposable pump drive for discard of said disposable pump cartridge and container upon exhaustion of the fluid in said container and replacement of the same with another disposable pump cartridge and fluid container.

* * * * *